(12) United States Patent
Bransom et al.

(10) Patent No.: US 7,555,771 B2
(45) Date of Patent: Jun. 30, 2009

(54) SYSTEM AND METHOD FOR GROUPING DEVICE OR APPLICATION OBJECTS IN A DIRECTORY SERVICE

(75) Inventors: Bradley P. Bransom, Round Rock, TX (US); Christopher J. Conner, Jonestown, TX (US)

(73) Assignee: Dell Products L.P., Round Rock, TX (US)

( * ) Notice: Subject to any disclaimer, the term of this patent is extended or adjusted under 35 U.S.C. 154(b) by 862 days.

(21) Appl. No.: 11/085,852

(22) Filed: Mar. 22, 2005

(65) Prior Publication Data

US 2006/0236380 A1 Oct. 19, 2006

(51) Int. Cl.
*H04L 9/32* (2006.01)
*G06F 7/04* (2006.01)
(52) U.S. Cl. ............................................ 726/6; 726/27
(58) Field of Classification Search ....................... 726/6
See application file for complete search history.

(56) References Cited

U.S. PATENT DOCUMENTS

| | | | | |
|---|---|---|---|---|
| 5,987,471 | A | 11/1999 | Bodine et al. ................ | 707/103 |
| 6,366,913 | B1 | 4/2002 | Fitler, Jr. et al. ................ | 707/9 |
| 6,772,157 | B2 * | 8/2004 | Barnett et al. .................... | 707/9 |
| 6,901,433 | B2 | 5/2005 | San Andres et al. .......... | 709/216 |
| 7,092,942 | B2 * | 8/2006 | Frieden et al. .................. | 707/9 |
| 7,219,234 | B1 * | 5/2007 | Ashland et al. .............. | 713/182 |
| 7,350,229 | B1 * | 3/2008 | Lander ............................ | 726/8 |
| 2002/0013827 | A1 | 1/2002 | Edstrom et al. .............. | 709/219 |
| 2002/0124082 | A1 | 9/2002 | San Andres et al. .......... | 709/225 |

(Continued)

FOREIGN PATENT DOCUMENTS

| | | |
|---|---|---|
| CA | 2407620 | 11/2001 |
| JP | 553896 | 3/1993 |
| WO | 2005043408 | 5/2005 |

OTHER PUBLICATIONS

Adams et al., "The PRIMA System for Privilege Management Authorization and Enforcement in Grid Environments", 2003, IEEE, Proceedings of the Fourth Internatiional Workshop on Grid Computing (GRID'03), pp. 1-8.*

(Continued)

*Primary Examiner*—Matthew B Smithers
(74) *Attorney, Agent, or Firm*—Baker Botts L.L.P.

(57) ABSTRACT

A method of managing access to a network resource is provided. An access query generated by a user requesting access to one of a group of resources is received. In response, a directory schema is used to determine the privileges assigned to the user for accessing the resource. The directory schema includes an association object associating user objects representing multiple users, a resource group object representing the group of resources, and privilege objects representing privileges of users for accessing each of the group of resources such that the association defines the privileges of various users for accessing the group of resources. Determining the user's privileges for accessing the resource includes using a first link between a resource object representing the resource and the resource group object and a second link between the resource group object and the association object identify the association object, and using the identified association object to determine the privileges assigned to the user for accessing the resource. The determined privileges of the user for accessing the resource are then communicated to the resource.

22 Claims, 2 Drawing Sheets

U.S. PATENT DOCUMENTS

| | | | |
|---|---|---|---|
| 2003/0224781 A1 | 12/2003 | Milford et al. | 455/426.1 |
| 2004/0267670 A1 | 12/2004 | Minyailov | 705/51 |
| 2005/0021660 A1 | 1/2005 | San Andres et al. | 709/216 |
| 2005/0027795 A1 | 2/2005 | San Andres et al. | 709/203 |
| 2005/0027796 A1 | 2/2005 | San Andres et al. | 709/203 |
| 2005/0027797 A1 | 2/2005 | San Andres et al. | 709/203 |
| 2005/0166260 A1* | 7/2005 | Betts et al. | 726/4 |
| 2006/0059546 A1* | 3/2006 | Nester et al. | 726/5 |
| 2006/0117390 A1* | 6/2006 | Shrivastava et al. | 726/27 |
| 2006/0174323 A1* | 8/2006 | Brown et al. | 726/3 |
| 2007/0089167 A1* | 4/2007 | Villavicencio | 726/5 |
| 2007/0157297 A1* | 7/2007 | Patrick | 726/6 |

OTHER PUBLICATIONS

Park et al., "Role Based Access Control on the Web", Feb. 2001, ACM Transactions on Information and System Security, vol.4, No. 1, pp. 37-71.*

ProLiant Management and Integrated Lights-Out assorted articles, www.hp.com, 27 pgs. Printed Jul. 6, 2006.

* cited by examiner

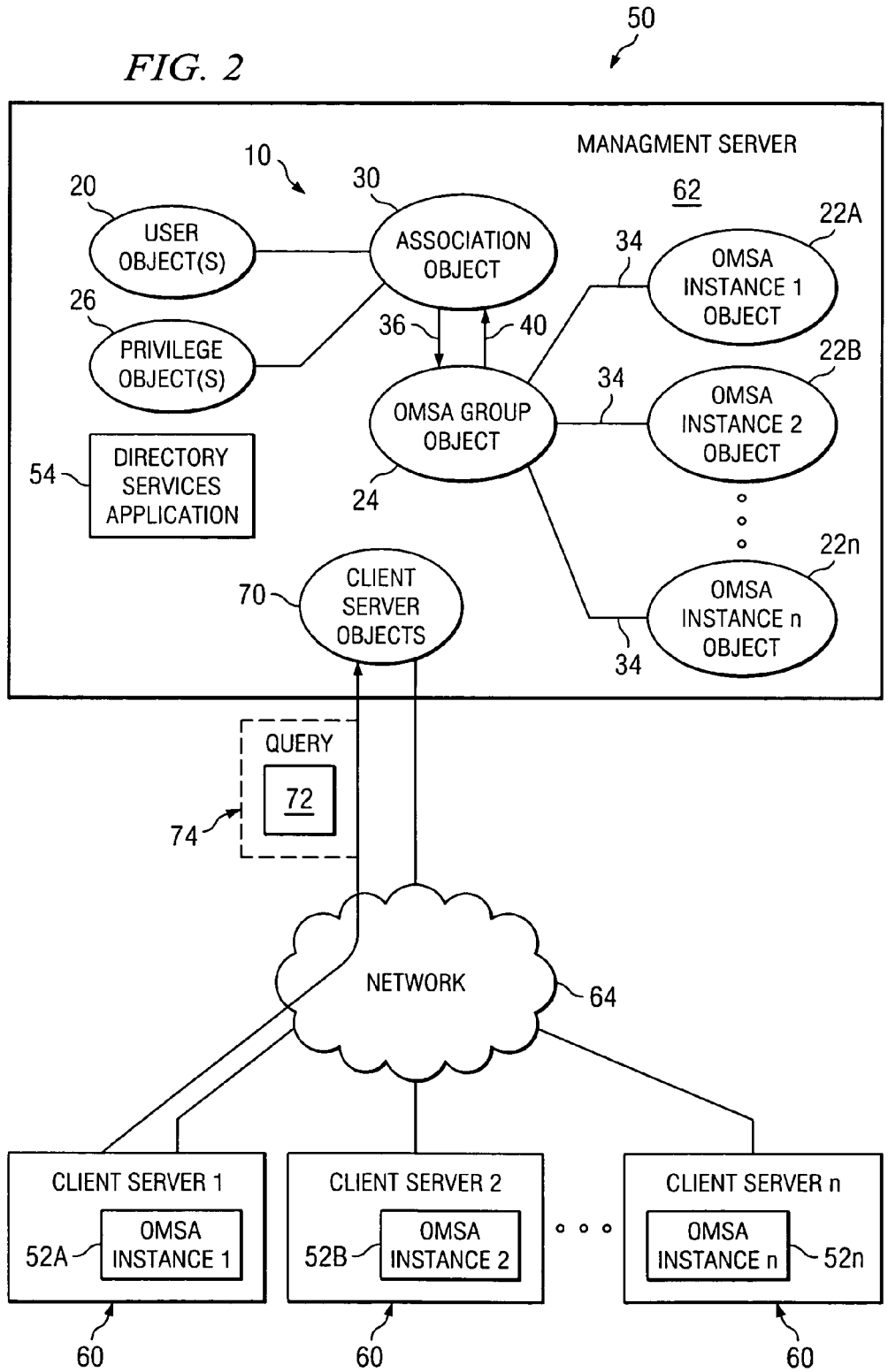

SYSTEM AND METHOD FOR GROUPING DEVICE OR APPLICATION OBJECTS IN A DIRECTORY SERVICE

TECHNICAL FIELD

The present disclosure relates generally to information handling systems and, more particularly, to a system and method for grouping device or application objects in a Directory Service.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with each other and with peripherals through networks, such as Ethernet-based wire line networks or 802.11-based wireless networks. Businesses have found that networking information handling systems improves productivity by better managing information for the coordinated activities of employees. Often, business networks become quite large, supporting a substantial number of users across multiple servers and multiple locations. Typically, different users are provided with varying levels of access to various network resources, such as devices or applications, by defining specific privileges associated with each user. For instance, privileges define information approved for access by a user, such as sensitive business information having access limited to executives, officers or directors of the business, or sensitive personal information having access limited to human resources personnel. As another example, privileges define actions approved for access by a user, such as approval to set and alter system configurations limited to information technology administration. Often varying groups of employees are assigned varying privileges so that a given network user may belong to several groups with each group having one or more associated privileges. Such groups of employees having a particular level a privileges for a particular network resource, such as a device or application, may be identified by various labels, such as "administrators," "power users," and "guests," for example.

One difficulty with having varying levels of privileges that govern access to a network is managing the users or groups of users associated with each privilege. Typically, user privileges are tracked in a network privilege directory (or directory services) database, such as the ACTIVE DIRECTORY database from MICROSOFT. A user who seeks to access a privilege through a network has the access confirmed through user privilege data stored in the network privilege directory. However, local configuration of user privileges presents a substantial network management challenge of keeping up with employees who join and leave a business and tends to detract from the convenience of a common directory database for controlling user accesses. In particular, defining cross-domain user groups is difficult, often requiring re-creation of user groups in each domain, a costly and time-consuming process. An alternative is to define universal groups that work across domains, however, defining and maintaining universal groups of users for more centralized management of network accesses also faces difficulties. For instance, universal groups replicated to an ACTIVE DIRECTORY Global Catalog causes bloat and requires that any changes to user access privileges be replicated to the global catalog before becoming effective, presenting security problems until replication is complete. For this and other reasons, information technology administrators tend to avoid using universal groups.

Another difficulty with having varying levels of privileges that govern access to network resources is managing such user privileges for large numbers of network resources, such as devices or applications. For example, when multiple instances of a particular software application are added to a network, a network administrator may be required to add each individual instance of the software application into an authentication/authorization schema such that each software instance is tied to an association object that ties that software instance to particular users and the appropriate privileges assigned to each user regarding that software instance. This process may be time consuming, expensive, and otherwise difficult to manage.

SUMMARY

Therefore, a need has arisen for systems and methods for allowing the grouping of resource objects in a directory services authentication/authorization schema, while maintaining access query functionality.

In accordance with one embodiment of the present disclosure, a method of managing access to a resource in a network is provided. An access query generated in response to a user submitting a request to access a particular one of a group of resources in a network is received from the particular resource, the access query regarding the particular user's privileges for accessing the particular resource. In response to receiving the access query, a directory schema stored in a computer-readable medium is used to determine the particular user's privileges for accessing the particular resource. The directory schema includes multiple association objects including a particular association object associated with the particular resource. The particular association object defines associations between one or more user objects representing multiple users, a resource group object representing the group of resources, and one or more privilege objects representing privileges of users for access to each of the group of resources such that the association defines the privileges of each of the multiple users for accessing any of the group of resources. For each user, that user's privileges for accessing any of the group of resources may be the same. Determining the particular user's privileges for accessing the particular resource includes (a) using a first link between a resource object representing the particular resource and the resource group object and a second link between the resource group object and the association object to identify the particular association object associated with the particular resource, and (b) in response to identifying the particular association object associated with the particular resource, determining based on the associations defined by the particular association object the privileges for the particular user for accessing the particular resource. A response to the access query including the determined privileges of the particular user for accessing the particular resource may be communicated to the particular resource.

In accordance with another embodiment of the present disclosure, a computer-readable medium having computer-executable instructions for managing access to a resource in a network is provided. The computer-executable instructions include instructions for receiving from a particular one of a group of resources in a network an access query generated in response to a user submitting a request to access the particular resource, the access query regarding the particular user's privileges for accessing the particular resource. The computer-executable instructions also include instructions for, in response to receiving the access query, using a directory schema stored in a computer-readable medium to determine the particular user's privileges for accessing the particular resource. The directory schema includes multiple association objects including a particular association object associated with the particular resource. The particular association object defines associations between one or more user objects representing multiple users, a resource group object representing the group of resources, and one or more privilege objects representing privileges of users for access to each of the group of resources such that the association defines the privileges of each of the multiple users for accessing any of the group of resources. For each user, that user's privileges for accessing any of the group of resources may be the same. Determining the particular user's privileges for accessing the particular resource includes (a) using a first link between a resource object representing the particular resource and the resource group object and a second link between the resource group object and the association object to identify the particular association object associated with the particular resource, and (b) in response to identifying the particular association object associated with the particular resource, determining based on the associations defined by the particular association object the privileges for the particular user for accessing the particular resource. The computer-executable instructions also include instructions for communicating to the particular resource a response to the access query including the determined privileges of the particular user for accessing the particular resource.

In accordance with yet another embodiment of the present disclosure, an information handling system including a processor, a memory coupled to the processor, and a directory schema stored in the memory is provided. The directory schema is operable to allow management of user privileges for multiple resources, the directory schema and includes one or more user objects representing multiple users, multiple resource object, each representing one of a group of resources, a resource group object representing the group of resources, one or more privilege objects representing privileges of users for access to each of the group of resources, an association object, multiple first links, and a second link. The association object defines associations between the user objects, the privilege objects and the resource group object such that the association defines the privileges of each of the multiple users for accessing any of the group of resources. For each user, that user's privileges for accessing any of the group of resources may be the same. Each of the multiple first links is a link between the resource group object and the resource object representing one of the group of resources. The second link is a link between the resource group object and the association object. The second link provides an information pathway from the resource group object to the association object such that when a particular user attempts to access a particular resource in the group of resources, an access query pathway including one of the first links and the second link is provided from the resource object representing the particular resource to the association object, allowing the association object to be queried to determine the privileges of the particular user for accessing the particular resource.

One technical advantage of the present disclosure is that systems and methods for managing user access to particular resources in a network is provided that allows resources to be grouped in an authentication/authorization schema used in such management of resources. In particular, by providing a backlink in a authentication/authorization schema from a resource group object to an association object, an access query for determining a user's access to a particular resource may be routed back to the association object, which association object may then be used to determine the user's privileges for accessing the particular resource. In other words, the backlink allows for grouping resource objects in an authentication/authorization schema of a directory services application, while maintaining access query functionality. Thus, groups of resource objects may be added to, removed from, or otherwise managed with respect to, an association object in an authentication/authorization schema, rather than having to be added, removed, or otherwise managed individually. This solution may increase efficiency, reduce network administrator time and costs, as well as increase the accuracy of the information within the authentication/authorization schema of the directory services.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates an example network for providing privileged access to resources using a network directory services application including the directory services authentication/authorization schema of FIG. 1 in accordance with one embodiment of the application.

DETAILED DESCRIPTION

Figure 1:
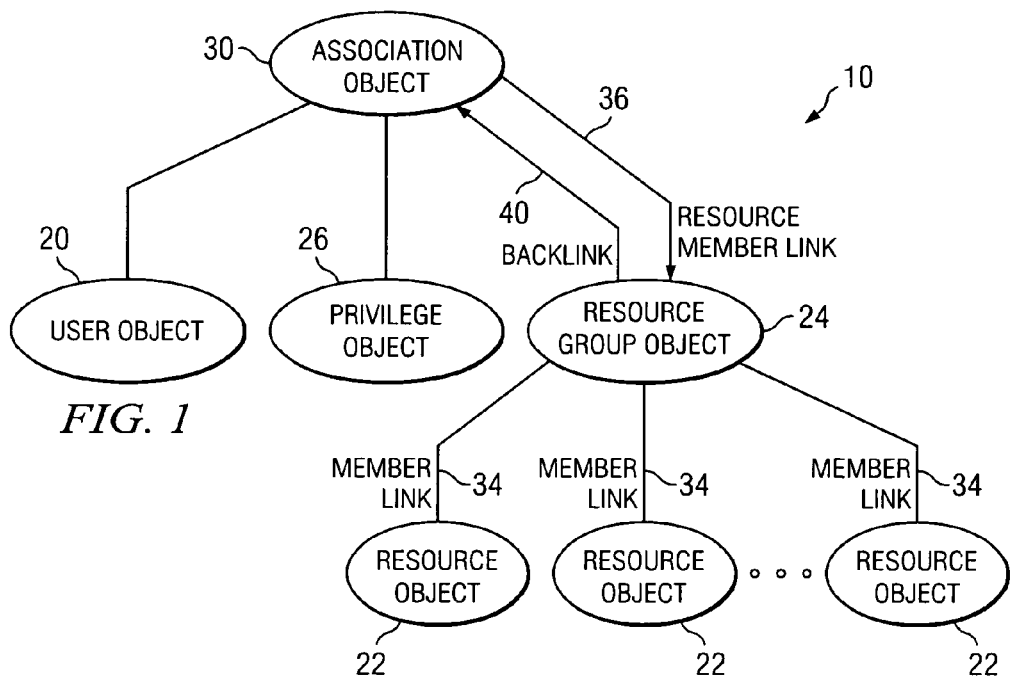
FIG. 1 illustrates an example directory services authentication/authorization schema 10 according to one embodiment of the present disclosure.
Figure 3:
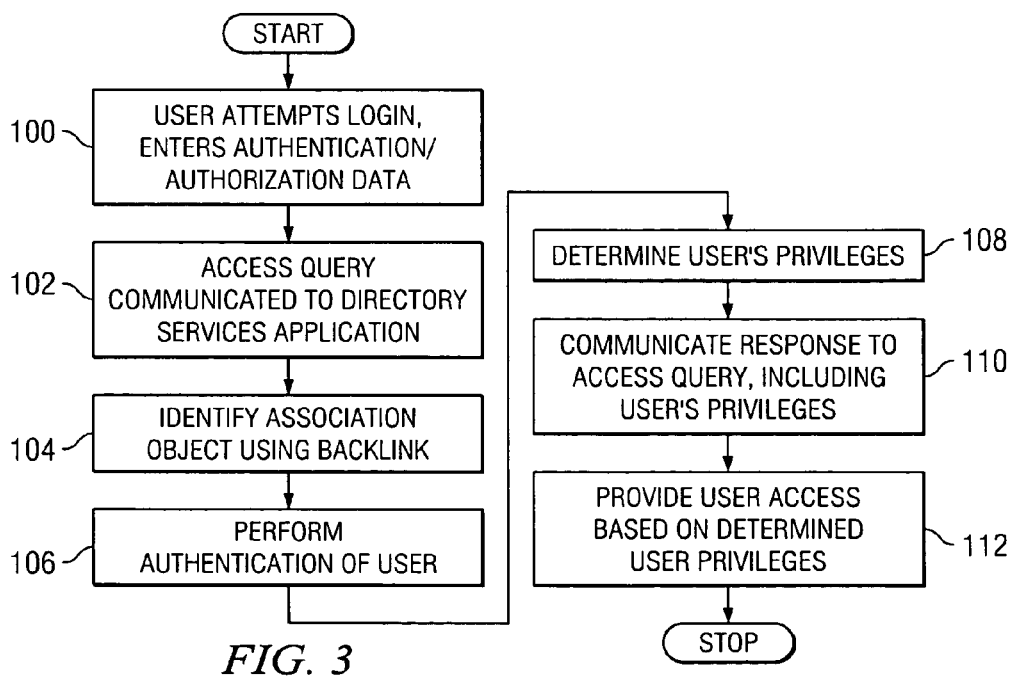
FIG. 3 illustrates an example method of the network of FIG. 2 managing user access to a resource in accordance with one embodiment of the disclosure.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates an example directory services authentication/authorization schema 10 according to one embodiment of the present disclosure. As discussed in greater detail below, authentication/authorization schema 10 is an authentication/authorization schema that may be used by a directory services application (such as ACTIVE DIRECTORY, for example) for managing customers' (or other users') access to particular resources in a network, such as products, devices, or software applications, for example. In particular, authentication/authorization schema 10 may allow resources to be grouped while maintaining desired authentication/authorization query functionality. Thus, the directory services authentication/authorization schema may support grouping of resources.

Referring to FIG. 1, directory services authentication/authorization schema 10 includes an one or more user objects 20 representing multiple users, multiple resource objects 22, each representing one of a group of resources, a resource group object 24 representing the group of resources, and one or more privilege objects 26 representing privileges of users for accessing each of the group of resources represented by resource group object 24. Schema 10 also includes an association object 30 defining associations between user objects 20, resource group object 24, and privilege objects 26. Such associations define the privileges of each of the multiple users represented by user objects 20 for accessing any of the group of resources represented by resource group object 24. For example, association object 30 may define that each user represented by a particular user object 20 may have the same set of privileges regarding each of the multiple resources represented by resource group object 24.

Schema 10 also includes a number of member links 34, each member link 34 linking resource group object 24 with one of the multiple resource objects 22, such that each resource object 22 is a member of resource group object 24, and resource group object 24 has multiple members (i.e., resource objects 22). Some embodiments may include any number of additional levels of member hierarchy which may be similarly joined by member links 34. For example, schema 10 resource group object 24 may be only one of multiple resource group objects 24, each of which are members of a larger group object. Thus, each of the multiple resource group objects 24 may be linked to the larger group object by a member link 34.

Schema 10 also includes a resource member link 36 between association object 30 and resource group object 24, such that association object 30 may associate users and user privileges with the resources represented by resource group object 24. In addition, an association object members backlink 40 is added to resource group object 24, which points back from resource group object 24 to association object 30. Backlink 40 allows resource group object 24 to identify association object 30, of which resource group object 24 is a member, which allows authentication/authorization queries for access to the resources represented by resource group object 24 to identify association object 30, and thus execute properly. As discussed below, backlink 40 provides an information pathway from resource group object 24 to association object 30 such that when a particular user attempts to access a particular resource in the group of resources represented by resource group object 24, an access query pathway 42 including a particular member link 34 and backlink 40 is provided from the resource object 22 representing the particular resource to association object 30, thus allowing association object 30 to be queried to determine the privileges of the particular user for accessing the particular resource.

User object 20 represents one or more users or groups of user, which may include various entities associated with a network, such as customers, administrators, managers, guests, etc. In an example embodiment, user object 20 represents a first group of users entitled "Power Users," a second group of users entitled "Administrators," and a third group of users entitled "Guests." Each resource object 22 may represent one or more resources, which may include any type of resource in a network, such as network or other computer devices, software applications, or pieces or components of a software application, for example. The group of resources represented by resource group object 24 may include any suitable grouping of resources having one or more common characteristic, such as, for instance, multiple instances of a particular resource, multiple components of a larger resource, or a related set of different resources. For example, the group of resources represented by resource group object 24 may include multiple instances of an Open Manage Server Administrator (OMSA) application. Each instance may run on a different information handling system (e.g. server, workstation, or other computer terminal), as discussed below regarding FIG. 2.

Privilege object 26 represents or defines privileges of users or groups of users represented by user object 20 for accessing the group of resources represented by resource group object 24. Privilege object 26 may include lists or sets of privileges that may be tied to various users or groups of users. For example, privilege object 26 may define a first set of privileges labeled "Power User privileges" for a first group of users labeled "Power Users" accessing OMSA application instances, a second set of privileges labeled "Administrator privileges" for a second group of users entitled "Administrators" accessing OMSA application instances, and a third set of privileges labeled "Guest privileges" for a third group of users entitled "Guests" accessing OMSA application instances.

In operation, when a user attempts to access a particular resource, the user may enter authentication/authorization information (such as a name/user ID and password, for example) into an interface associated with the particular resource. The particular resource may generate and communicate an access query to a directory services application, which may include directory services authentication/authorization schema 10. The access query is a query to determine whether the user has access to the particular resource, and if so, which privileges the user has with respect to the particular resource. The access query may include some or all of the authentication/authorization information entered by the user. The directory services may then use authentication/authorization schema 10 to determine the user's privileges for accessing the particular resource. This may include identifying association object 30 associated with the particular resource by following (a) a member link 34 from the resource object 22 representing the particular resource to resource group object 24 and (b) backlink 40 from resource group object 24 to association object 30. Once association object 30 associated with the particular resource is identified, the directory services may then determine, based on the associations defined by association object 30, the privileges for the user for accessing the particular resource. The directory services may then communicate back to the particular resource a response to the access query that includes the determined privileges of the user for accessing the particular resource.

FIG. 2 illustrates an example network 50 operable to provide privileged access to resources 52 (52A-52n) using a network directory services application 54 including the directory services authentication/authorization schema 10 of FIG. 1 in accordance with one embodiment of the application. Network 50 includes any number of client servers 60 coupled to a directory services management server 62 by a communications network 64. Each client server 60 and/or directory services management server 62 may include one or more information handling systems. Communications network 64 may include any local area network (LAN), metropolitan area network (MAN), wide area network (WAN), wireless local area network (WLAN), virtual private network (VPN), intranet, the Internet, or any other appropriate architecture or system that facilitates communications in a network environment.

Directory services application 54 may include any application operable to manage user access to particular resources in a network, such as ACTIVE DIRECTORY by MICROSOFT, for example. Directory services application 54 may maintain and manage various data objects, including user objects 20, resource objects 22 (22A-22n) representing resources 52 (52A-52n), resource group objects 24 representing groups of resources 52, privilege objects 26, and association objects 30 defining associations between user objects 20, resource group object 24, and privilege objects 26, such as discussed above regarding FIG. 1. Directory services application 54 may manage such objects using directory services authentication/authorization schema 10 shown in FIG. 1, or similar schema. Management server 62 may also maintain one or more client server object(s) 70 representing the multiple client servers 60 of network 50. Client server object(s) 70 may communicate with directory services application 54 such that directory services application 54 may receive and manage access queries received from client servers 60.

Each of multiple client servers 60 may include one or more resources 52 having access managed by directory services application 54. In the example embodiment shown in FIG. 2, resources 52A-52n comprise instances of an OMSA application. Thus, resource objects 22A-22n comprise OMSA application objects, which are representations of OMSA application instances, and resource group object 24 comprises an OMSA application group object. However, as discussed above, resources 52 may include any type of resources in a network, such as network or other computer devices, software applications, or portions or components of a software application, for example.

FIG. 3 illustrates an example method of network 50 of FIG. 2 managing user access to a resource in accordance with one embodiment of the disclosure. At step 100, a particular user attempts to log in to an OMSA application instance 52A at a particular client server 60. OMSA application instance 52A may provide the particular user a login interface, such as a screen having fields for entering authentication/authorization information 72 (such as a name/particular user ID and password, for example). The particular user may enter authentication/authorization information 72 into the interface provided by OMSA application instance 52A. In response, at step 102, OMSA application instance 52A may generate and communicate an access query 74 to directory services application 54, as indicated in FIG. 2. Access query 74 is a query to determine whether the particular user has access to OMSA application instance 52A, and if so, which privileges the particular user has with respect to OMSA application instance 52A. Access query 74 may include some or all of the authentication/authorization information 72 entered by the particular user.

At steps 104-108, directory services application 54 may receive access query 74 and use authentication/authorization schema 10 to determine the particular user's privileges for accessing OMSA application instance 52A. First, at step 104, directory services application 54 may identify association object 30 associated with OMSA application instance 52A by routing access query 74 along an information pathway defined by authentication/authorization schema 10 that includes (a) a member link 34 from OMSA application object 22A representing OMSA application instance 52A to OMSA application group object 24 and (b) backlink 40 from OMSA application group object 24 to association object 30.

Once association object 30 associated with OMSA application instance 52A is identified using backlink 40, directory services application 54 may then use association object 30 to perform the authentication/authorization of the particular user for accessing OMSA application instance 52A. At step 106, directory services application 54 may determine, based on the authentication/authorization information 72 received with access query 74, whether the particular user can log into OMSA application instance 52A (i.e., authentication of the particular user). If so, at step 108, directory services application 54 may determine, based on the associations defined by association object 30, which privileges the particular user has regarding OMSA application instance 52A (i.e., authorization of the particular user).

At step 110, directory services application 54 may then communicate back to OMSA application instance 52A a response to access query 74 that includes the results of the authentication/authorization performed at steps 104-108, including the determined privileges (if any) of the particular user regarding OMSA application instance 52A. At step 112, OMSA application instance 52A may then provide the particular user the access defined by the determined privileges for that user.

By providing backlink 40 from OMSA application group object 24 to association object 30, access query 74 is able to be routed from the OMSA application instance 52A all the way to association object 30 defining associations for OMSA application object 22A associated with OMSA application instance 52A. Without such backlink 40, access query 74 could not identify association object 30, and thus the query would fail. Thus, backlink 40 allows for grouping resource objects 52 in an authentication/authorization schema (e.g., authentication/authorization schema 10 discussed herein) of a directory services application, while maintaining access query functionality. Thus, groups of resource objects 52 may be added to, removed from, or otherwise managed with respect to, an association object 30, rather than having to be added, removed, or otherwise managed individually. This solution may increase efficiency, reduce network administrator time and costs, as well as increase the accuracy of the information within the authentication/authorization schema of the directory services.

Although the disclosed embodiments have been described in detail, it should be understood that various changes, substitutions and alterations can be made to the embodiments without departing from their spirit and scope.

What is claimed is:

1. A method of managing access to a resource in a network, comprising:
receiving from a particular one of a group of resources in a network an access query generated in response to a user submitting a request to access the particular resource, the access query regarding the particular user's privileges for accessing the particular resource;
in response to receiving the access query, using a directory schema stored in a computer-readable medium to determine the particular user's privileges for accessing the particular resource, the directory schema including multiple association objects including a particular association object associated with the particular resource, the particular association object defining associations between one or more user objects representing multiple users, a resource group object representing the group of resources, and one or more privilege objects representing privileges of users for access to each of the group of resources such that the association defines the privileges of each of the multiple users for accessing any of the group of resources, wherein for each user, that user's privileges for accessing any of the group of resources is the same, wherein the one or more user objects, the resource group object, the one or more privilege objects, and the particular association object are all separate objects from each other;
wherein determining the particular user's privileges for accessing the particular resource includes:
using a first link between a resource object representing the particular resource and the resource group object and a second link between the resource group object and the association object to identify the particular association object associated with the particular resource;
in response to identifying the particular association object associated with the particular resource, determining based on the associations defined by the particular association object the privileges for the particular user for accessing the particular resource; and
communicating to the particular resource a response to the access query including the determined privileges of the particular user for accessing the particular resource.

2. The method of claim 1, wherein the group of resources comprises a group of hardware devices.

3. The method of claim 1, wherein the group of resources comprises a group of software applications.

4. The method of claim 3, wherein the group of resources comprises multiple instances of a particular software application.

5. The method of claim 4, wherein the group of resources comprises multiple instances of a server administration application.

6. The method of claim 1, wherein the directory schema is used in an ACTIVE DIRECTORY database from MICROSOFT.

7. The method of claim 1, wherein:
the received access query includes authentication information regarding the particular user; and
determining the particular user's privileges for accessing the particular resource includes identifying the particular user based at least on the authentication information in the received access query.

8. The method of claim 1, wherein:
the directory schema includes multiple resource objects, each representing one of the group of resources; and
the directory schema defines multiple first links, each first link between a resource object representing one of the group of resource and the resource group object.

9. A computer-readable medium having computer-executable instructions for managing access to a resource in a network, comprising:
instructions for receiving from a particular one of a group of resources in a network an access query generated in response to a user submitting a request to access the particular resource, the access query regarding the particular user's privileges for accessing the particular resource;
instructions for, in response to receiving the access query, using a directory schema stored in a computer-readable medium to determine the particular user's privileges for accessing the particular resource, the directory schema including multiple association objects including a particular association object associated with the particular resource, the particular association object defining associations between one or more user objects representing multiple users, a resource group object representing the group of resources, and one or more privilege objects representing privileges of users for access to each of the group of resources such that the association defines the privileges of each of the multiple users for accessing any of the group of resources, wherein for each user, that user's privileges for accessing any of the group of resources is the same, wherein the one or more user objects, the resource group object, the one or more privilege objects, and the particular association object are all separate objects from each other;
wherein determining the particular user's privileges for accessing the particular resource includes:
using a first link between a resource object representing the particular resource and the resource group object and a second link between the resource group object and the association object to identify the particular association object associated with the particular resource;
in response to identifying the particular association object associated with the particular resource, determining based on the associations defined by the particular association object the privileges for the particular user for accessing the particular resource; and
instructions for communicating to the particular resource a response to the access query including the determined privileges of the particular user for accessing the particular resource.

10. The computer-readable medium of claim 9, wherein the group of resources comprises a group of hardware devices.

11. The computer-readable medium of claim 9, wherein the group of resources comprises a group of software applications.

12. The computer-readable medium of claim 11, wherein the group of resources comprises multiple instances of a particular software application.

13. The computer-readable medium of claim 12, wherein the group of resources comprises multiple instances of a server administration application.

14. The computer-readable medium of claim 9, wherein the directory schema is used in an ACTIVE DIRECTORY database from MICROSOFT.

15. The computer-readable medium of claim 9, wherein:
the received access query includes authentication information regarding the particular user; and
determining the particular user's privileges for accessing the particular resource includes identifying the particular user based at least on the authentication information in the received access query.

16. The method of claim 9, wherein:
the directory schema includes multiple resource objects, each representing one of the group of resources; and
the directory schema defines multiple first links, each first link between a resource object representing one of the group of resource and the resource group object.

17. An information handling system, comprising:
a processor;
a memory coupled to the processor; and
a directory schema stored in the memory and operable to allow management of user privileges for multiple resources, the directory schema including:
one or more user objects representing multiple users;
multiple resource objects, each representing one of a group of resources;
a resource group object representing the group of resources;
one or more privilege objects representing privileges of users for access to each of the group of resources;
an association object defining associations between the user objects, the privilege objects and the resource group object such that the association defines the privileges of each of the multiple users for accessing any of the group of resources, wherein for each user, that user's privileges for accessing any of the group of resources is the same;
wherein the one or more user objects, the resource objects, the resource group object, the one or more privilege objects, and the association object are all separate objects from each other;
multiple first links, each first link between the resource group object and the resource object representing one of the group of resources; and
a second link between the resource group object and the association object, the second link providing an information pathway from the resource group object to the association object such that when a particular user attempts to access a particular resource in the group of resources, an access query pathway including one of the first links and the second link is provided from the resource object representing the particular resource to the association object allowing the association object to be queried to determine the privileges of the particular user for accessing the particular resource.

18. The system of claim 17, wherein the group of resources comprises a group of hardware devices.

19. The system of claim 17, wherein the group of resources comprises a group of software applications.

20. The system of claim 19, wherein the group of resources comprises multiple instances of a particular software application.

21. The system of claim 20, wherein the group of resources comprises multiple instances of a server administration application.

22. The system of claim 17, wherein the directory schema is used in an ACTIVE DIRECTORY database from MICROSOFT.

* * * * *